Nov. 13, 1951     E. E. SIVACEK     2,574,504
WINDSHIELD WIPER MECHANISM
Filed Oct. 30, 1946     3 Sheets-Sheet 1
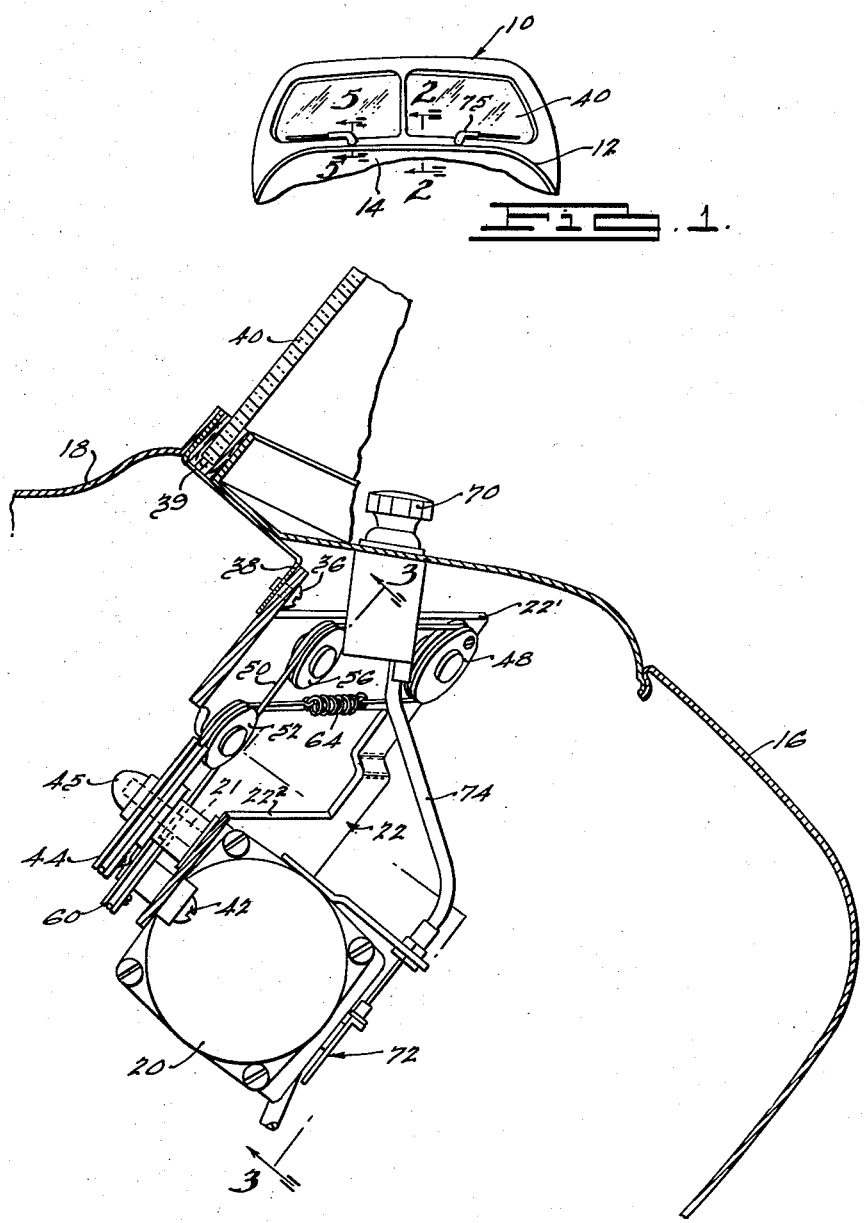
INVENTOR.
Emil E. Sivacek.
BY
Harness, Dickey & Pierce.
ATTORNEYS.

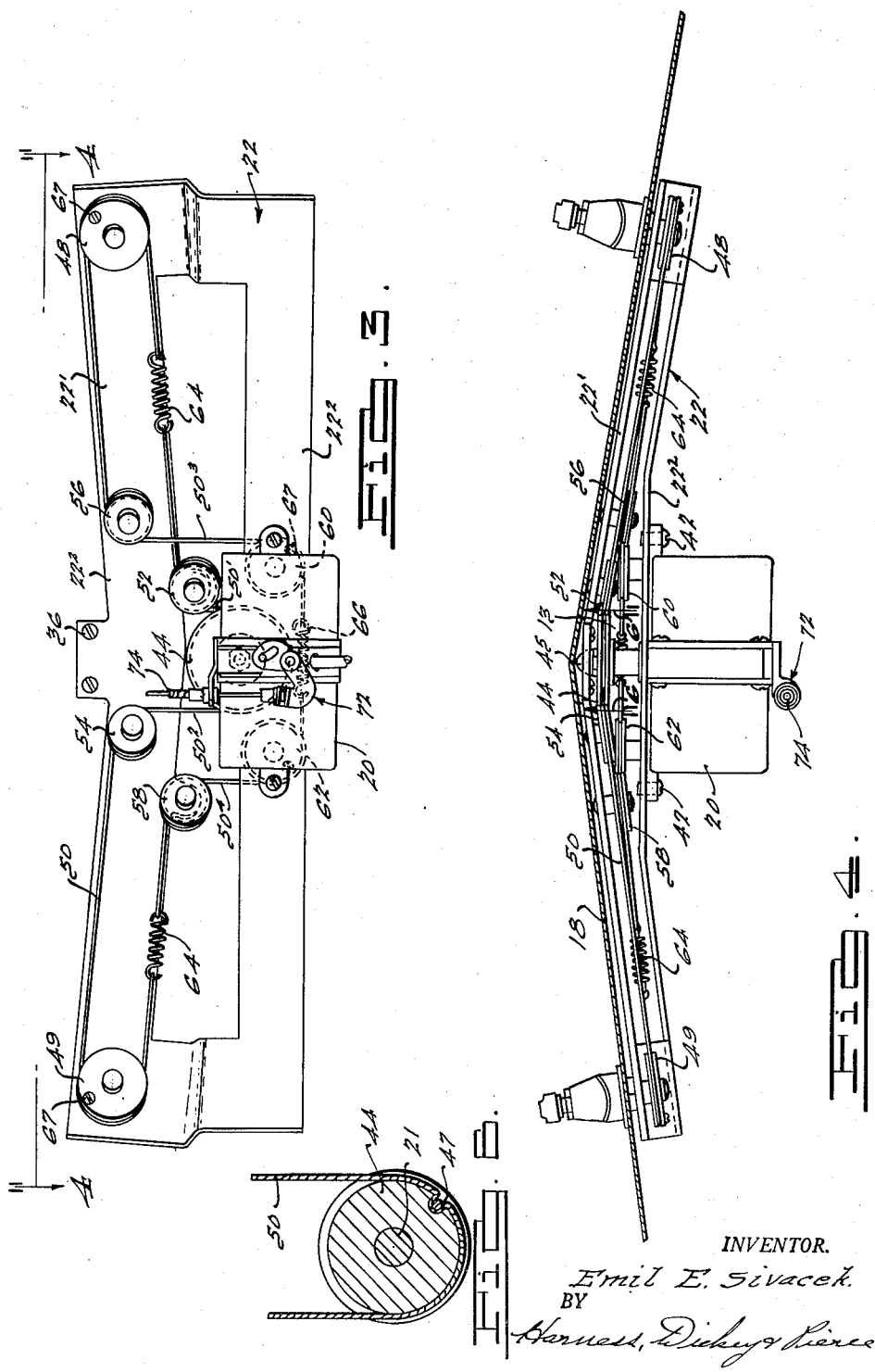

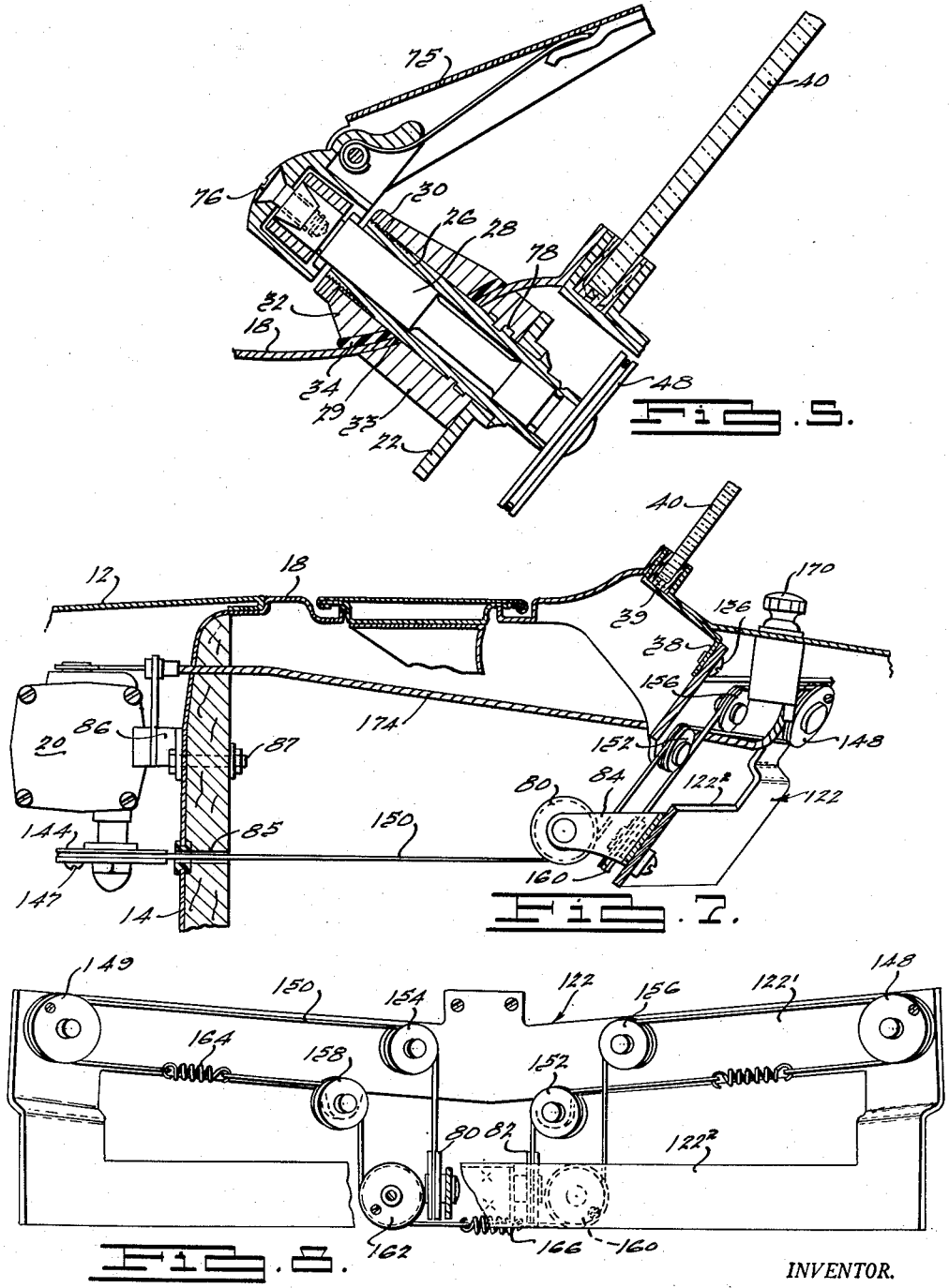

Patented Nov. 13, 1951

2,574,504

UNITED STATES PATENT OFFICE 2,574,504

WINDSHIELD WIPER MECHANISM

Emil E. Sivacek, Ann Arbor, Mich., assignor to King-Seeley Corporation, Ann Arbor, Mich., a corporation of Michigan Application October 30, 1946, Serial No. 706,578

7 Claims. (Cl. 74—722)

1

The present invention relates to driving mechanisms, particularly for dual windshield wipers, constituting a further development of the invention disclosed in my copending application Serial No. 628,159 filed November 13, 1945.

An important object of the present invention is to provide such a drive mechanism of simple, reliable, rugged, and fool-proof construction, which is quiet in operation, easy to install, and convenient to adjust, both in original installation and in event any servicing, repair or replacement becomes necessary. A related object is to provide an improved driving mechanism of the indicated character which is readily adaptable, with minor variations, to installation in vehicles having parts of varying shapes and dimensions to which the drive installation must be accommodated.

Another object of the invention is to provide such a driving system utilizing a single looped cable serving to connect the driving motor to both of the driven shafts carrying the windshield wiper arms, means being incorporated to automatically take up all mechanical tolerances between the motor and arms, and the drive being effectively transmitted from the motor shaft to both of the wiper blades despite the fact that the motor shaft and the driven shafts are all angularly disposed with relation to one another.

Still another object is to provide such a driving system so arranged that the motor serving as the source of power may be mounted either at a remote point, as under the engine hood, or directly upon a supporting bracket which carries the other components of the driving mechanism.

Other objects and advantages will be apparent upon consideration of the present disclosure in its entirety.

In the drawings:

Fig. 1 is a fragmentary front elevational view of a motor vehicle provided with windshield wiper drive mechanism constructed in accordance with the present invention, Fig. 2 is a vertical sectional view taken substantially on the line 2—2 of Fig. 1 and looking in the direction of the arrows, Fig. 3 is a rear elevational view of the driving mechanism and motor installation taken substantially as indicated by the line and arrows 3—3 of Fig. 2, Fig. 4 is a sectional plan view taken substantially on the line 4—4 of Fig. 3 and looking in the direction of the arrows, Fig. 5 is a vertical sectional view taken substantially on the line 5—5 of Fig. 1 and looking in the direction of the arrows,

2

Fig. 6 is a sectional detail taken substantially on the line 6—6 of Fig. 4 and looking in the direction of the arrows, and Figs. 7 and 8 are views corresponding respectively to Figs. 2 and 3, but showing a somewhat modified construction.

Referring now to the drawings, reference character 10 designates generally a motor vehicle body, indicated as of conventional construction and incorporating an engine compartment enclosed by a hood 12 and separated from the passenger compartment by a fire wall 14, between which and the instrument panel 16 is a space, enclosed by the cowl 18, within which various components including my improved windshield driving mechanism may be housed in a position out of the view of the occupants of the vehicle but accessible for servicing. It will be appreciated that the details of construction of the vehicle form no part of my present invention and may be varied to suit considerations of engineering and design. Similarly, any suitable type of windshield wiper driving motor may be employed, the motor 20 depicted herein being of the variety disclosed in Bell Patent No. 2,354,189 issued July 25, 1944, and also in my copending application Serial No. 610,557, filed August 13, 1945.

In the embodiment of the invention shown in Figs. 1 to 6 inclusive all portions of the wiper driving mechanism, including the motor 20 which serves as the source of power, are carried on a unitary sheet metal supporting frame assembly 22 which may be pre-assembled with all operating components and installed in the vehicle as a unit. The frame is of hollow rectangular form, having transverse top and bottom portions designated 22', 22² respectively. The windshield 40 and its supporting portions are indicated as of the familiar V construction, and the end portions of the supporting frame 22 are bent to conforming angularity, as best shown in plan in Fig. 4. The central area of the lower frame portion 22² is formed as a flat transverse section which when installed extends at right angles to the longitudinal centerline of the vehicle, and it will be noted that a space, designated 13, is thus provided forward of such frame portion and within the V of the windshield supporting framework, adapted to accommodate certain of the pulleys and other components of my improved driving mechanism. The upper transverse frame section 22' is offset forwardly and veed, as viewed in horizontal section, so that it is adapted to lie close to the underside of the cowl and directly beneath the lower edge of the windshield 40, as best shown in Figs. 4 and 5.

Near its upper outer corners the frame supports swivel bearing bushings 26, fast therein and projecting forwardly therefrom and adapted to project through openings 29 in the cowl. Bushings 26 support the wiper blade driving shafts 28, and also serve as hangers for the frame 22 when the latter is installed, each bushing being clamped in position with respect to the cowl by means of a nut 30 secured upon the threaded extremity of the bushing, suitably contoured filler blocks as 32 and 33, and gasketing 34 being provided to support the parts in desired spaced relation and to provide a weather seal. The arrangement of these parts corresponds to that disclosed in my copending application first above mentioned. Additional support for the central portion of the frame is preferably afforded by screws 36 which secure the central upper frame portion to a flange as 38 formed integrally with the windshield supporting frame member 39.

The motor 20 may be secured as by suitable mounting screws 42 to the lower transverse portion 22² of the supporting frame 22, the motor shaft 21 projecting forwardly through frame portion 22² and carrying upon its extremity a driving pulley 44, normally held fast upon the shaft as by the acorn nut 45, although the pulley may be freed to permit angular adjustment thereof with respect to the shaft by loosening the nut. A driven pulley as 48, 49 is also fast upon the inner end of each of the wiper shafts 28, and driving connection between the motor pulley 44 and driven pulleys 48, 49 is provided by an endless belt or cable assembly generally designated 50.

The cable is rove over suitable idler sheaves as 52, 54, 56, 58, 60, 62. It will be noted that the sheaves 52, 54 are at an angle to driving pulley 44 and are arranged above the same, each such idler sheave having its groove so aligned with the groove in pulley 44 as to be connectible thereto by a line tangent to both. The angular training of the cable is therefore accommodated by twist in the vertical sections 50′, 50², of the cable connecting such grooves. The same is true of the vertical cable sections 50³, 50⁴, connecting the sheaves 56, 60 and 58, 62, respectively. Sheaves 60, 62 lie parallel to the driving pulley 44, while sheaves 56, 58, carried by the upper cross leg 22′ of the frame are angularly disposed with respect to pulley 44, the grooves of the sheaves in question being vertically aligned so that the connecting cable portions 50³, 50⁴ permit such angular training to be taken up in twist of the cable about its axis in such vertical cable portions. Slippage between the driving pulley and cable is prevented (Fig. 6) by a pin 47 extending transversely through a slot (undesignated) formed as a deepened section of the pulley groove, the cable being trained under the pin within such transverse slot and the dimensions of these parts being such, as best indicated in Fig. 6, as to prevent slippage between the cable and pulley.

Tension springs as 64, 66 may be incorporated in the cable, and the cable is also preferably locked against slippage with respect to the driven pulleys 48, 49 as by transverse pins 67, the arrangement of which may correspond to that of pin 47 previously described.

It will be seen that the idler arrangement shown in the drawings is such as to cause the driven pulleys and the wiper blades drivable thereby to rotate in opposite directions, the cable being led from the driving motor pulley to the underside of driven pulley 48 by idler sheave 52 and to the topside of driven pulley 49 by idler sheave 54. The return legs of the looped cable are guided over idler sheaves 56, 58, and thence downwardly and rove under idlers 60, 62, to complete the loop. The cable may be similarly locked against slippage with respect to sheaves 60, 62, as by means of pins 67, to prevent displacement of the cable tension take-up spring 66 arranged between the last-mentioned sheaves.

Operation of the motor 20 may be controlled by a knob 70 conveniently mounted above the instrument panel as indicated in Fig. 2 and connected to the motor-control mechanism, generally designated 72, as by the Bowden cable 74. It will be recognized that the details of these parts form no part of the present invention.

The complete driving assembly including the motor may be factory-assembled and adjusted, and installed in the vehicle as a unit in a very quick and simple manner, since it is only necessary to pass the bushings 26 through the suitably spaced holes 29 in the cowl, apply the outer filler blocks 32, nuts 30 and screws 36 and then install the wiper blade assemblies, generally designated 75, each of which may be held upon the end of its shaft 28 by means of a single screw as 76. The details of construction of the wiper blade assemblies and their mounting means also form no part of my present invention and are disclosed in my copending application first above referred to. It will be noted, however, that filler blocks 33 which bear against the underside of the cowl 18 are preassembled upon bushings 26, to which they are held by keying portions 78 formed upon the surface of the bushings and interfitted with suitable portions of the filler blocks, which may be integrally cast in place. Simultaneous adjustment of the positions of both wiper blades may be effected by loosening the acorn nut 45 and moving the blades and motor shaft with respect to one another, as previously indicated. The blades may be prefixed in proper angular relationship so that adjustment should not normally be necessary over the expected life of the assembly, although if it should be required due to accident or other cause the keying screws 67 may simply be loosened to permit the cable to slide with respect to the appropriate driven pulley 48 or 49, and it will be seen that in this manner quick and simple adjustment may be effected.

The cable driving mechanism is noiseless in operation, all lost motion being taken up in the pulleys and other parts as well as in the cable by the springs 64, 66, so that noise cannot be caused either by operation of the parts or by vibration thereof caused by motion of the vehicle.

In order to reduce still further the noise level within the passenger compartment, the driving motor 20 may be mounted in the engine compartment, upon the forward side of the fire wall 14, as shown in the modified construction depicted in Figs. 7 and 8. In the description of such modified construction, parts equivalent to those already described are designated by like reference characters one hundred integers higher, and detailed redescription of many of these will not be required. Additional idler sheaves 80, 82, are provided, each rotatably mounted upon one arm of U bracket 84 welded or otherwise attached to the forward side of bottom cross leg 122² of the mounting bracket 122, sheaves 80, 82, being perpendicular to the bracket but tangentially aligned with respect to the grooves of sheaves 152, 154, so that the cable may be guided downwardly from sheaves 152, 154 and thence forward under the sheaves 80, 82, to extend through suitable openings as 85 in the fire wall 14 and to operative connection with the driving motor pulley 144, to which the cable may be keyed as by the pin 147. The motor is mounted upon the fire wall by suitable supporting bracket means as 86 and mounting bolts 87, and the motor-controlling Bowden cable 174 may also project through the fire wall, as best shown in Fig. 7. Since the fire wall ordinarily carries relatively heavy insulation, the driving motor is by this mounting arrangement rendered inaudible within the passenger compartment, and as previously indicated, the cable and pulley power conveying mechanism may be literally noiseless in operation, since all parts subject to noisemaking vibration are eliminated or held by the tensioning springs, while bearings may of course be permanently lubricated as by the use of oil impregnated materials and the like.

While it will be apparent that the preferred embodiments of my invention herein disclosed are well calculated to fulfill the object first above stated, it will be apparent that the invention is susceptible to variation, modification, and change within the spirit and scope of the subjoined claims.

I claim:

1. A driving mechanism for effecting oscillatory movement of windshield wipers and the like comprising a unitary support adapted to be mounted in predetermined relation to the windshield, driven shaft supporting means carried thereby, a driven shaft carried by said supporting means, and means for transmitting oscillatory movement to said shaft, said last named means including pulley means fast upon said shaft, guiding means also rotatably supported upon said support, an endless cable-type power-transmitting means trained over said pulley means and guiding means and adapted to be rove over a driving motor pulley, and means securing a portion of said endless cable-type power-transmitting means to said pulley means, said driving mechanism including a plurality of such driven shaft and driven pulley means carried by said support for driving a plurality of windshield wipers, said guiding means comprising a plurality of idler pulley means also mounted upon said support, and a certain of said pulley means being angularly disposed but tangentially aligned with respect to one another.

2. A driving mechanism for effecting oscillatory movement of windshield wipers and the like comprising a unitary support adapted to be mounted in predetermined relation to the windshield, driven shaft supporting means carried thereby, a driven shaft carried by said supporting means, and means for transmitting oscillatory movement to said shaft, said last named means including pulley means fast upon said shaft, guiding means also rotatably supported upon said support, an endless cable-type power-transmitting means trained over said pulley means and guiding means and adapted to be rove over a driving motor pulley, and means securing a portion of said endless cable-type power-transmitting means to said pulley means, said driving mechanism including a plurality of such driven shaft and driven pulley means carried by said support for driving a plurality of windshield wipers, said guiding means comprising a plurality of idler pulley means also mounted upon said support, certain of said pulley means being angularly disposed but tangentially aligned with respect to one another, and oscillating driving motor means also mounted upon said support and connected to said cable-type power-transmitting means.

3. A driving mechanism for effecting oscillatory movement of windshield wipers and the like comprising a unitary support adapted to be mounted in predetermined relation to the windshield, driven shaft supporting means carried thereby, a driven shaft carried by said supporting means, and means for transmitting oscillatory movement to said shaft, said last named means including pulley means fast upon said shaft, guiding means also rotatably supported upon said support, an endless cable-type power-transmitting means trained over said pulley means and guiding means and adapted to be rove over a driving motor pulley, and means securing a portion of said endless cable-type power-transmitting means to said pulley means, said support comprising a frame of substantially rectangular hollow form having transverse upper and lower sections offset out-of-plane with respect to one another, said pulley means and guiding means including elements carried by one side of one of said sections and by the opposite side of the other of said sections and over which said cable-type power-transmitting means is trained.

4. A driving mechanism for effecting oscillatory movement of windshield wipers and the like comprising a unitary support adapted to be mounted in predetermined relation to the windshield, driven shaft supporting means carried thereby, a driven shaft carried by said supporting means, and means for transmitting oscillatory movement to said shaft, said last named means including pulley means fast upon said shaft, guiding means also rotatably supported upon said support, an endless cable-type power-transmitting means trained over said pulley means and guiding means and adapted to be rove over a driving motor pulley, and means securing a portion of said endless cable-type power-transmitting means to said pulley means, said support comprising a frame of substantially rectangular hollow form having transverse upper and lower sections offset out-of-plane with respect to one another, said pulley means and guiding means including elements carried by one side of one of said sections and by the opposite side of the other of said sections over which said cable-type power-transmitting means is trained, said elements lying substantially in a plane intermediate the planes of said offset sections.

5. A driving mechanism for effecting oscillatory movement of windshield wipers and the like comprising a unitary support adapted to be mounted in predetermined relation to the windshield, driven shaft supporting means carried thereby, a driven shaft carried by said supporting means, and means for transmitting oscillatory movement to said shaft, said last named means including pulley means fast upon said shaft, guiding means also rotatably supported upon said support, an endless cable-type power-transmitting means trained over said pulley means and guiding means and adapted to be rove over a driving motor pulley, and means securing a portion of said endless cable-type power-transmitting means to said pulley means, said support comprising a frame of substantially rectangular hollow form having transverse upper and lower sections offset out-of-plane with respect to one another, said pulley means and guiding means including elements carried by one side of one of said sections and by the opposite side of the other of said sections over which said cable-type power-transmitting means is trained, said elements lying substantially in a plane intermediate the planes of said offset sections, and certain of said pulley means and guiding means having cable-receiving portions angularly disposed but tangentially aligned with respect to one another.

6. A driving mechanism for effecting oscillatory movement of windshield wipers and the like comprising a unitary support adapted to be mounted in predetermined relation to the windshield, driven shaft supporting means carried thereby, a driven shaft carried by said supporting means, and means for transmitting oscillatory movement to said shaft, said last named means including pulley means fast upon said shaft, guiding means also rotatably supported upon said support, an endless cable-type power-transmitting means trained over said pulley means and guiding means and adapted to be rove over a driving motor pulley, and means securing a portion of said endless cable-type power-transmitting means to said pulley means, said support comprising a frame of substantially rectangular hollow form having transverse upper and lower sections offset out-of-plane with respect to one another, said pulley means and guiding means including elements carried by one side of one of said sections and by the opposite side of the other of said sections over which said cable-type power-transmitting means is trained, said elements lying substantially in a plane intermediate the planes of said offset sections, and said cable-type power-transmitting means including portions extending between said sections and lying in said intermediate plane.

7. A driving mechanism for effecting oscillatory movement of windshield wipers and the like comprising a unitary support adapted to be mounted in predetermined relation to the windshield, driven shaft supporting means carried thereby, a driven shaft carried by said supporting means, and means for transmitting oscillatory movement to said shaft, said last named means including pulley means fast upon said shaft, guiding means also rotatably supported upon said support, an endless cable-type power-transmitting means trained over said pulley means and guiding means and adapted to be rove over a driving motor pulley, and means securing a portion of said endless cable-type power-transmitting means to said pulley means, said support comprising a frame of substantially rectangular hollow form having transverse upper and lower sections offset out-of-plane with respect to one another, said pulley means and guiding means including elements carried by one side of one of said sections and by the opposite side of the other of said sections over which said cable-type power-transmitting means is trained, said elements lying substantially in a plane intermediate the planes of said offset sections, certain of said pulley means and guiding means having cable-receiving portions angularly disposed but tangentially aligned with respect to one another, and said cable-type power-transmitting means including portions extending between said sections and lying in said intermediate plane, and serving to connect said tangentially aligned portions.

EMIL E. SIVACEK.

REFERENCES CITED

The following references are of record in the file of this patent:

UNITED STATES PATENTS

| Number | Name | Date |
|---|---|---|
| 397,629 | Butter | Feb. 12, 1889 |
| 398,359 | Tynan | Feb. 19, 1889 |
| 1,403,318 | Hensen | Jan. 10, 1922 |
| 2,405,377 | Sturgess | Aug. 6, 1936 |
| 2,178,066 | Clark | Oct. 31, 1939 |
| 2,250,806 | Logue | July 29, 1941 |